United States Patent [19]

Ukai et al.

[11] Patent Number: 5,604,596
[45] Date of Patent: Feb. 18, 1997

[54] COPYING APPARATUS HAVING DETERMINATION UNIT FOR SPECIAL ORIGINAL AND FOR CONTROLLING COPYING AND MARKING BASED ON DETERMINATION

[75] Inventors: Takeshi Ukai, Yokohama; Yasuhiro Tabata, Kawasaki, both of Japan

[73] Assignee: Ricoh Company, Ltd., Tokyo, Japan

[21] Appl. No.: 244,377

[22] PCT Filed: Oct. 7, 1993

[86] PCT No.: PCT/JP93/01444

§ 371 Date: Jun. 9, 1994

§ 102(e) Date: Jun. 9, 1994

[87] PCT Pub. No.: WO94/09590

PCT Pub. Date: Oct. 7, 1993

[30] Foreign Application Priority Data

Oct. 9, 1992 [JP] Japan .................. 4-297815

[51] Int. Cl.$^6$ .................. H04N 1/00; H04N 1/387; G03G 21/00; G06K 9/00
[52] U.S. Cl. .................. 358/296; 358/401; 358/448; 382/135; 399/366; 399/45
[58] Field of Search .................. 358/298, 296, 358/401, 405, 443, 448, 452, 453, 501, 526, 527, 531, 537, 538; 355/201; 382/135, 137, 165, 190, 209, 214, 224, 227

[56] References Cited

U.S. PATENT DOCUMENTS

| | | | |
|---|---|---|---|
| 5,216,724 | 6/1993 | Suzuki et al. .................. | 355/201 X |
| 5,257,119 | 10/1993 | Funada et al. .................. | 358/438 |
| 5,321,470 | 6/1994 | Hasuo et al. .................. | 355/201 |
| 5,363,202 | 11/1994 | Udagawa et al. .................. | 358/501 |
| 5,426,710 | 6/1995 | Suzuki et al. .................. | 382/135 |
| 5,434,649 | 7/1995 | Hasue et al. .................. | 355/201 |
| 5,444,518 | 8/1995 | Hashiguchi et al. .................. | 355/201 |

FOREIGN PATENT DOCUMENTS

| | | |
|---|---|---|
| 0342060 | 11/1989 | European Pat. Off. . |
| 0506332 | 9/1992 | European Pat. Off. . |
| 60-229572 | 11/1985 | Japan . |
| 0283571 | 9/1988 | Japan .................. G03G 21/00 |

OTHER PUBLICATIONS

Telecom Report, vol. 7, No. 5, pp. 305–309, Sep.–Oct. 1984, "Die Neuen Fernkopierer HF2020 und HF2021".

*Primary Examiner*—Eric Frahm
*Attorney, Agent, or Firm*—Oblon, Spivak, McClelland, Maier & Neustadt, P.C.

[57] ABSTRACT

A copying apparatus includes an image reading unit for optically reading an original and for outputting image signals, an image processing unit for processing the image signals from the image reading unit in accordance with a predetermined method and for outputting image data, a printer unit for forming an image corresponding to the image data from the image processing unit on a recording sheet, a determination unit for determining whether the rank of certainty that the original is the same as the special original such as paper money is a first rank or a second rank, a control unit for prohibiting the image corresponding to the image data from being formed on the recording sheet when the determination result obtained by the determination unit is the first rank, and a marking unit for adding a predetermined mark on the recording sheet when the determination result obtained by the determination unit is the second rank.

10 Claims, 17 Drawing Sheets

FIG. 15
(a)           (b)
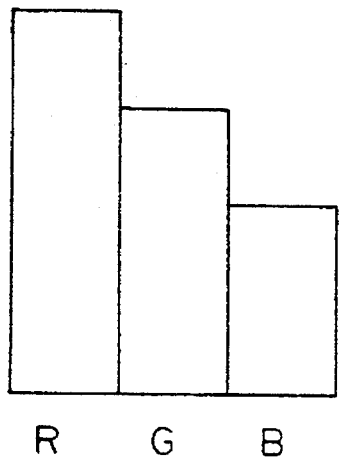
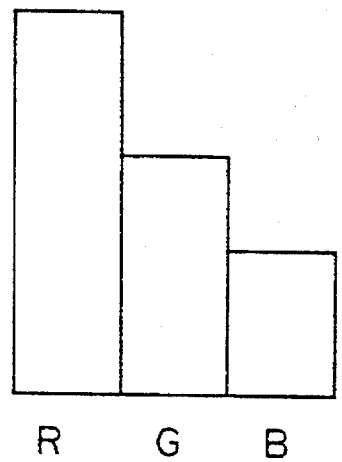
COLOR HISTOGRAM OF EXTRACTED ORIGINAL BACKGROUND PORTION
HISTOGRAM IN MEMORY (FOR COMPARING)
COMPARING

EXTRACTED
PATTERN

PATTERN IN
MEMORY
(FOR COMPARING)

COMPARING

FIG. 17
(a) 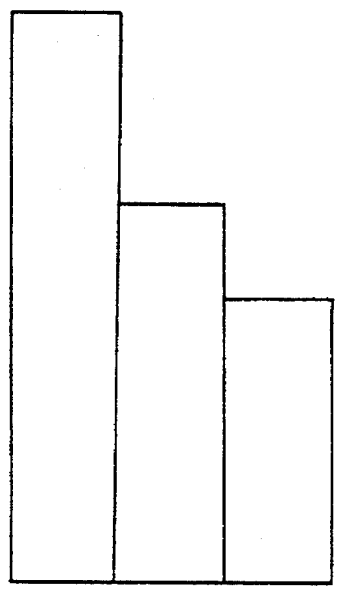
COLOR HISTOGRAM OF WHOLE OR PART OF DETECTED ORIGINAL
(b) 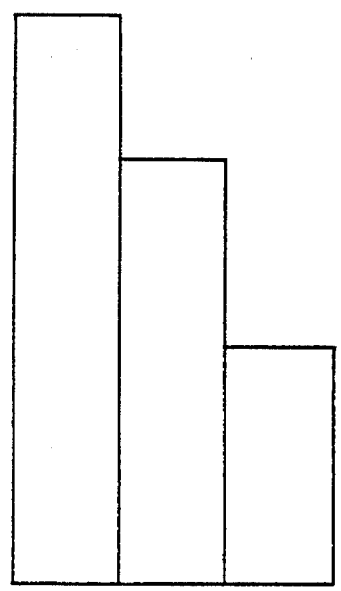
COLOR HISTOGRAM IN MEMORY (FOR COMPARING)
COMPARING

COPYING APPARATUS HAVING DETERMINATION UNIT FOR SPECIAL ORIGINAL AND FOR CONTROLLING COPYING AND MARKING BASED ON DETERMINATION

TECHNICAL FIELD

The present invention relates to a copying apparatus having a determination unit for determining whether or not an original to be copied is a special original, such as paper money and securities, which are prohibited from being copied by law.

BACKGROUND ART

In recent years, due to improvement of an image processing technique and an image forming technique, a copy of paper money obtained by a color copy machine is so exquisite that it is difficult to distinguish the copy from the actual paper money. Thus, a color copy machine has been proposed, in which a special original such as the paper money, which is prohibited from being copied by law, is detected and a copy operation for such a special original is prohibited from being carried out.

In an image recording apparatus disclosed, for example, in Japanese Laid Open Patent Application No.2-83571, image data obtained by reading of an original is compared with registered pattern data corresponding to a special original using a pattern matching method. It is then determined based on the comparison result whether or not the original is the special original (such as the paper money). When it is determined that the original is the special original, a copying operation for the original is prohibited or an image (an all black image) different from an original image is formed on a paper.

However, since there are limitations of image reading accuracy and image analyzing accuracy, it is difficult to determine, at a accuracy of 100%, whether or not an original set on the copy machine is the special original. Thus, a degree to which an image obtained by reading the original (an input image) is similar to the pattern data is evaluated as a similarity value. If the similarity value for the input image is equal to or greater than a predetermined reference similarity value, it is generally determined that the original to be copied is the special original.

In a case where it is determined, using the similarity value as has been described above, whether or an original set on the copy machine is the special original, if the original is clearly seen as being the special original, or if the original is clearly seen as being not the special original, it can be accurately determined whether or not the original is the special original or not. However, in a case of the original which is hardly seen as being the special original, such as a case of dirty paper money or a sample of securities, the determination result depends on the reference similarity value set in the copy machine. For example, if the reference similarity value is high, an original which should be determined as being the special original is easily determined as not being the special original. Thus, a case where the special original is illegally copied may occur. On the other hand, if the reference similarity value is low, an original which should be determined as being not the special original is easily determined as being the special original. Thus, a case where a copy process for a normal original is prohibited may occurs. In this case, the efficient copy process is deteriorated.

In addition, it has also been tried that input images are analyzed in detail and it is determined based on the analysis result whether or not an original corresponding to the input images is the special original. However, in this case, it takes a long time for the analysis of the input images, so that a processing speed is deteriorated when a normal original is copied.

DISCLOSURE OF THE INVENTION

Accordingly, a general object of the present invention is to provide a copying apparatus having a determination unit for the special original in which apparatus the disadvantages described above are eliminated.

A more specific object of the present invention is to provide a copying machine in which a copy of a normal original can be carried out without hindrance and having a determination unit for the special original which unit prevents any special original from being copied without limitation.

The above objects of the present invention are achieved by a copying apparatus comprising: image reading means for optically reading an original and for outputting image signals corresponding to the original; image processing means for processing the image signals supplied from the image reading means in accordance with a predetermined method and for outputting image data; image forming means for forming an image corresponding to the image data supplied from the image processing means on a recording sheet; original determination means for determining whether a rank of certainty that the original is a predetermined special original is a first rank or a second rank lower than the first rank; prohibiting means for prohibiting the image corresponding to the original from being formed on the recording sheet when the determination result obtained by the original determination means is the first rank; information adding means for adding predetermined information to the recording sheet on which the image is formed by the image forming means when the determination result obtained by the original determination means is the second rank.

According to the present invention, in a case where the rank of certainty that the original is the same as the special original such as paper money is high (the first rank), the copy operation of the original is prohibited. If an original having a low rank of certainty that the original is the same as the special original is a normal original, an image forming operation is not prohibited and an image corresponding to the original is formed on a recording sheet. In this case, although the predetermined information is added to the recording sheet, there is no hindrance in the image forming process. On the other hand, even if an original having a low rank of certainty that the original is the same as the special original, since the predetermined information is added to the recording sheet on which the image corresponding to the original is formed, the copying apparatus in which the special original such as paper money was copied can be identified by the predetermined information.

Additional objects, features and effects of the present invention will become apparent from the following detailed description when read in conjunction with the accompanying drawings.

BRIEF DESCRIPTION OF THE DRAWINGS

FIG. 15 is a diagram illustrating another method of determining the special original.

FIG. 17 is a diagram illustrating another method of determining the special original.

BEST MODE FOR CARRYING OUT THE INVENTION

A description will now be given of embodiments of the present invention.

Figure 1:
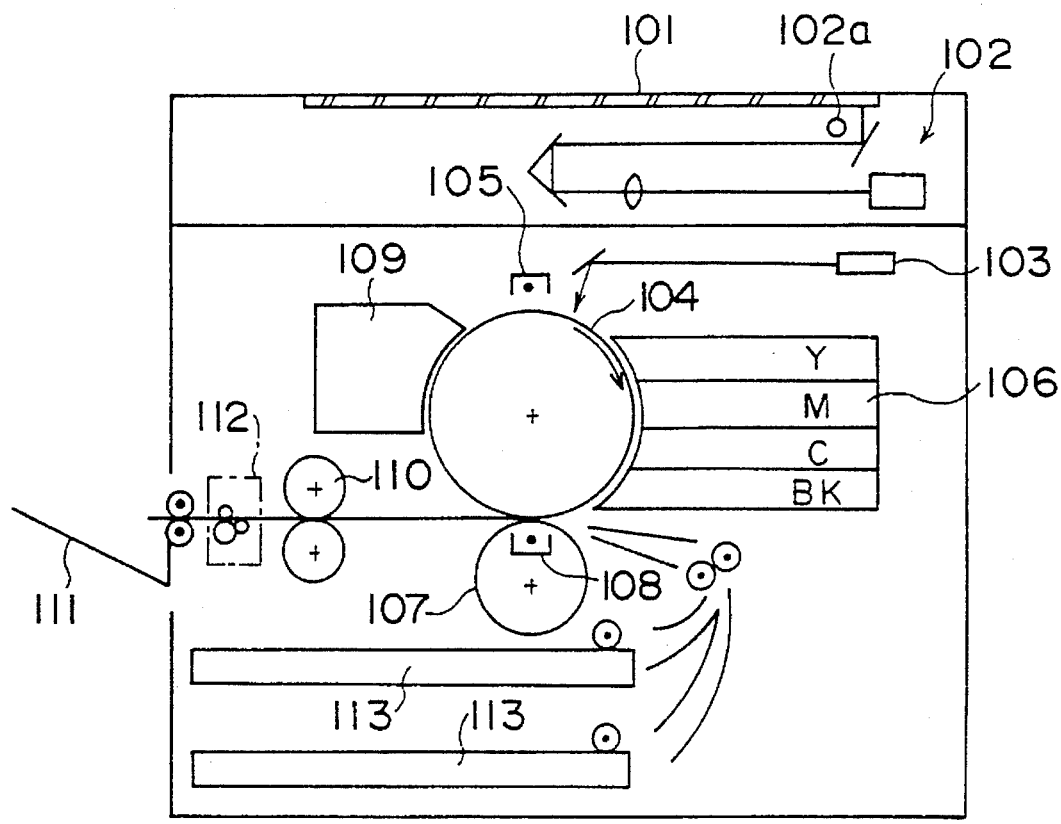
FIG. 1 is a diagram illustrating an example of a structure of a copying apparatus according to the present invention.

FIG. 1 shows a structure of a copying apparatus according to a first embodiment of the present invention. Referring to FIG. 1, this copying apparatus has an original setting base 101 on which an original is to be set, an optical scanning system 102, a laser writing unit 103, a photosensitive drum 104, a charging unit 105 for uniformly charging the photosensitive drum 104, a developing unit 106, a transfer drum 107, a transferring charger 108, a cleaning unit 109, a fixer unit 110, an ejecting tray 111, a marking unit 112 and a paper supply unit 113. The optical scanning system 102 has an exposure lamp 102a, optically scans an original on the original setting base 101, and outputs image signals corresponding to the original. The laser writing unit 103 emits a laser beam modulated based on image data caused by the image signals from the optical scanning system 102. The laser beam is project onto the photosensitive drum 104 which has been uniformly charged. Due to projecting the laser beam, an electrostatic latent image is formed on the photosensitive drum 104. The developing unit 106 has four sections for supplying to the photosensitive drum 104 yellow-toner (Y), magenta-toner (M), cyan-toner (C) and black toner (BK) respectively. The electrostatic latent image formed on the photosensitive drum 104 is developed by the respective color toner. A recording paper ejected from the paper supply unit 113 is wound on the transfer drum 107, respective color toner images are transferred to the recording paper by the operation of the transferring charger 108 so as to be superposed on each other. As a result, a multi-colored image is formed on the recording paper. The multi-colored image is fixed on the recording paper by the fixer unit 110. After passing through the fixer unit 110, the recording paper is ejected to the ejecting tray 111 via the marking unit 112. Toner remaining on the photosensitive drum 104 after the multi-colored image is transferred to the recording paper is removed from the photosensitive drum 104 by the cleaning unit 109.

Figure 2:
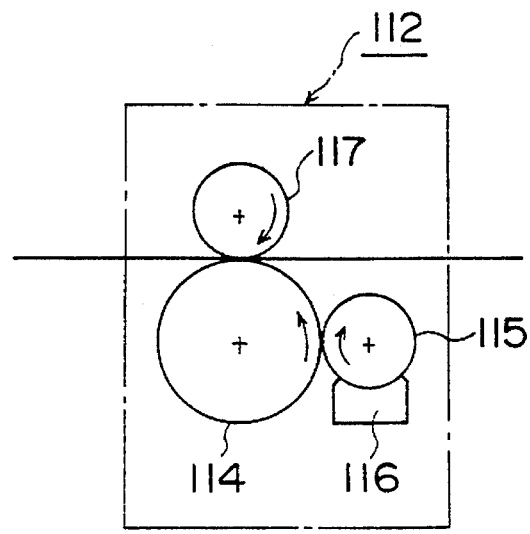
FIG. 2 is a diagram illustrating a detailed structure of a marking unit provided in the copying machine.

The marking unit 112 is formed, for example, as shown in FIG. 2. Referring to FIG. 2, the marking unit 112 has a marking roller 114, an ink roller 115, an ink supplier 116 and a pressure roller 117. The marking roller 114 is rotated with contacting the ink roller 115 to which ink is supplied from the ink supplier 116. The type of ink is not limited, but it is preferable that marks formed on a recording paper by the ink are not easily erased therefrom. In addition, it is preferable that ink having a loud color be used. In this case, a color of the ink must be determined so that the quality of images formed on a surface of the recording paper is not affected by marks formed on the opposite surface of the recording paper by the ink. Furthermore, special ink (made of indium-tin oxide, tin oxide or the like), such as ink having a high transmittance in a visible region and a low transmittance in a region other than visible region, may be used. In this case, marks printed by using the special ink are almost not visible normally, but the marks can be made visible by irradiation of a light beam, such as ultraviolet or infrared, other than the visible light.

Figure 3:
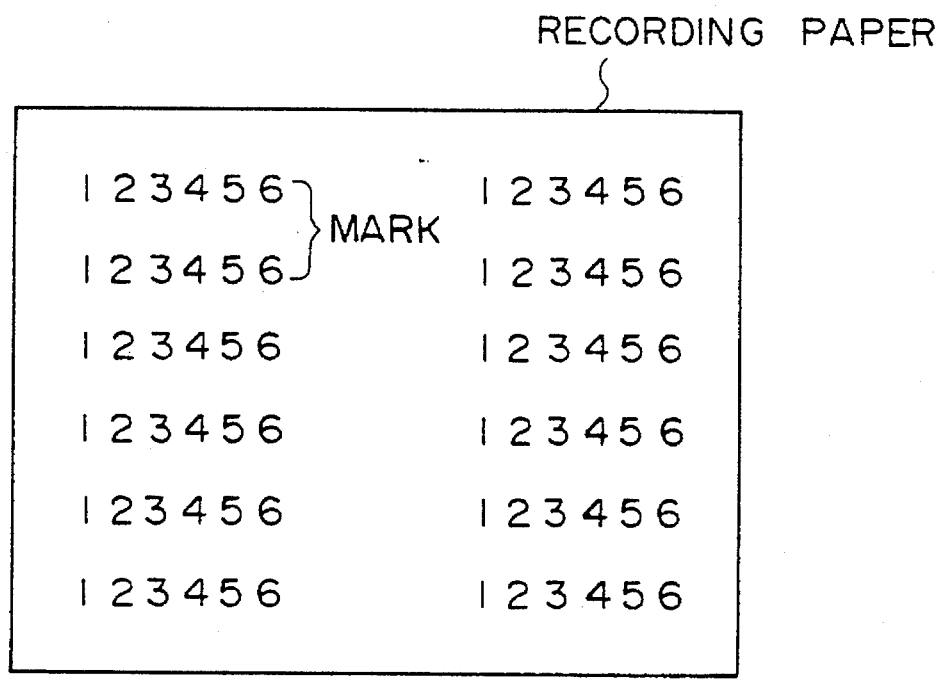
FIG. 3 is a diagram illustrating an example of arrangement of marks printed on a recording paper.

The marking roller 114 and the pressure roller 117 are normally separated from each other. At starting of a marking operation, the pressure roller 117 and/or the marking roller are moved so as to be close to each other. The pressure roller 117 presses the recording sheet against the marking roller 114 at a proper pressure so that a stable marking operation can be carried out. A moving mechanism for the pressure roller 117 and/or the marking roller is not shown in the figure, but can be easily formed by using known mechanisms. A plurality of numeral sets are carved on the surface of the marking roller 114. The ink is uniformly applied to the surface of the marking roller 114 by the ink roller 115, and marks formed of the respective numeral sets are printed on the rear surface of the recording paper, as shown in FIG. 3.

Figure 4:
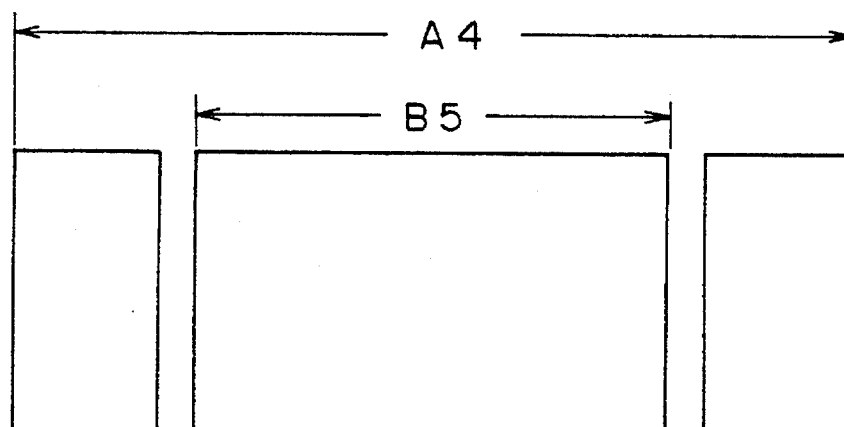
FIG. 4 is a diagram illustrating an example of an ink roller having a divided structure.

The marks formed of the respective numeral sets represent information identifying the copying apparatus, such as a maker number, a manufacturing number or a customer management number. The plurality of numeral sets carved on the surface of the marking roller 114 are arranged so that, even if the special original assumed to be minimum is set at any position on the original setting base 101, at least one mark is formed on the rear surface of a copy of the special original. In addition, the width of the marking roller 114 is determined based on the maximum width of the recording paper used in the copying apparatus. However, if the ink is applied to the whole surface of the marking roller 114 by the ink roller 115, the ink is transferred from the marking roller 114 to the pressure roller in a case where the recording paper having the width smaller than the maximum width is used. In this case, the surface of the recording sheet on which copied images are formed are brought into contact with the pressure roller, so that the surface of the recording paper is soiled. Thus, in this embodiment, the ink roller 115 is divided in accordance with the widths of the recording papers as shown in FIG. 4, and divided sections corresponding to the size of the used recording paper are selectively used. The distance between divided sections of the ink roller 115 may not affect the marks formed on the surface of the marking roller 114, and the strict accuracy is not required for the distance between the divided sections. In addition, the marking roller 114 may be divided in the same manner as the ink roller 115.

Figure 5:
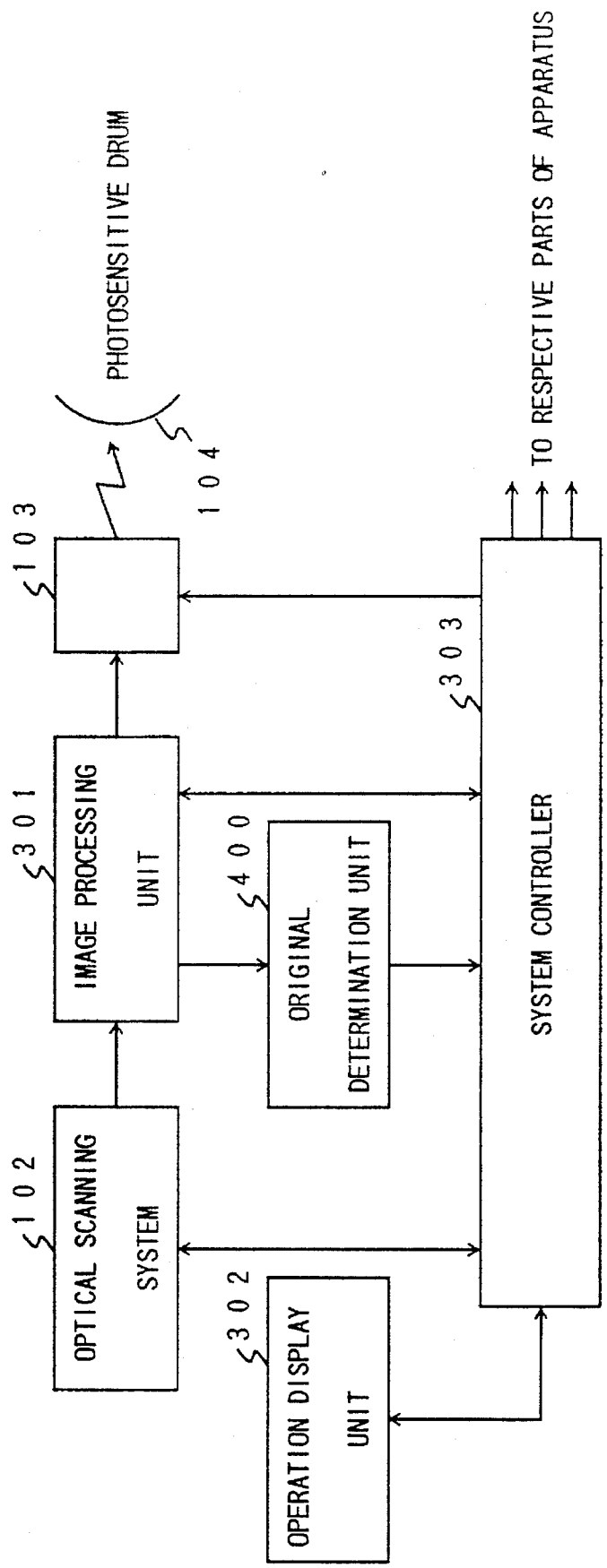
FIG. 5 is a block diagram illustrating a control circuit of a copying apparatus according to a first embodiment.

A control circuit of the copying apparatus as described above is formed as shown in FIG. 5. Referring to FIG. 5, an image sensor (e.g. a CCD sensor) of the optical scanning system 102 outputs image signals corresponding to a red color (R), a green color (G) and a blue color (B). The image signals are processed by a image processing unit 301 in accordance with various algorithms, so that the image signals are converted into image data items corresponding to a yellow color (Y), a magenta color (M), a cyan color (C) and a black color (BK). These image data items are supplied to the laser writing unit 103, so that the laser writing unit 103 emits a laser beam modulated based on the respective image data items. The image data obtained by digitizing the above image signals (R, G, B) is supplied from the image processing unit 301 to an original determination unit 400. The original determination unit 400 determines, based on the image data, whether or not the copying operation should be prohibited, or whether or not the marking unit 112 should be activated. The operation/display unit 302 is used to input various commands and to display various information items such as messages. The optical scanning system 102, the image processing unit 301, the laser writing unit 103, the original determination unit 400 and the operation/display unit 302 are controlled by a system controller 303.

Figure 6:
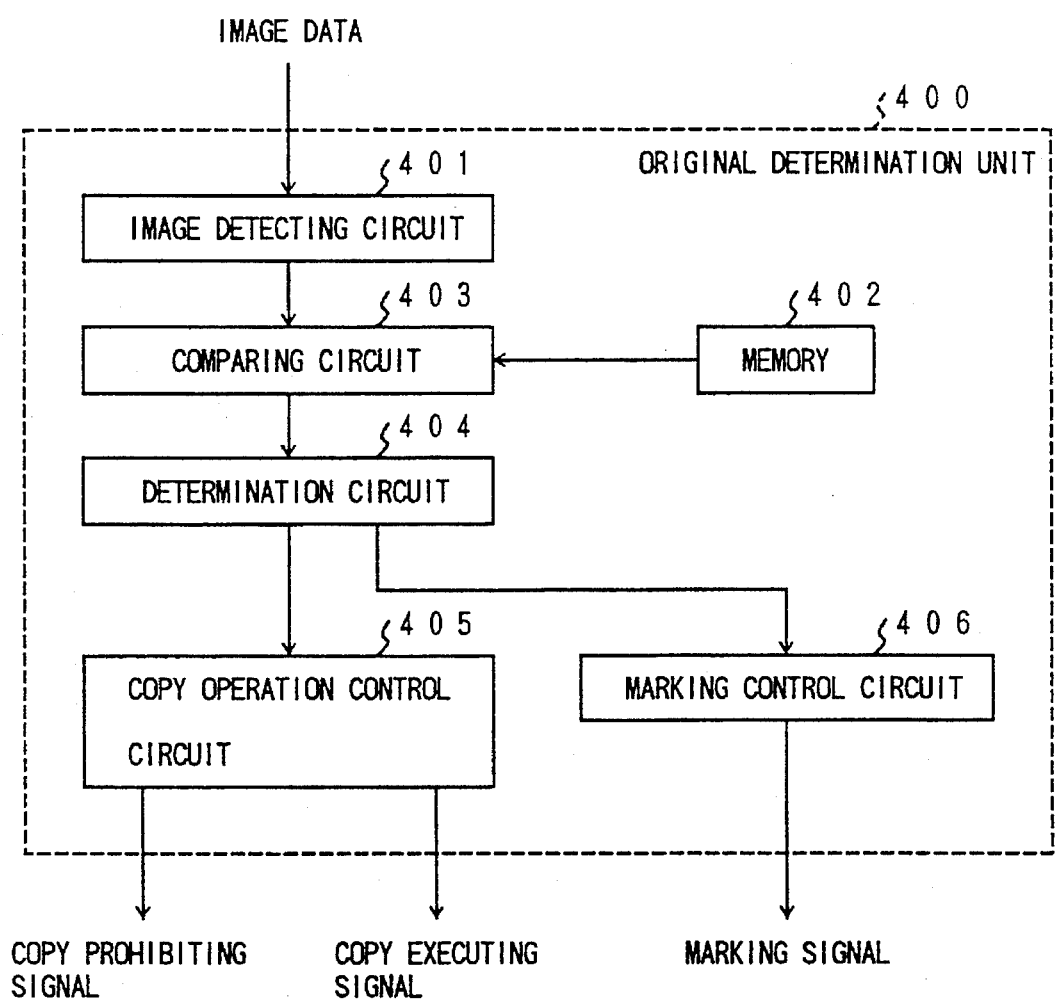
FIG. 6 is a diagram illustrating a constitution of an original determination unit provided in the control circuit shown in FIG. 5.

The original determination unit 400 is formed as shown in FIG. 6. Referring to FIG. 6, the original determination unit 400 has an image detecting circuit 401, a memory 402, a comparing circuit 403, a determination circuit 404, a copy operation control circuit 405 and a marking control circuit 406. The image detecting circuit 401 extracts data (special data), corresponding to characteristic portions which have been previously determined on the special original such as the paper money, from the image data. The memory 402 stores reference characteristic data identifying various special originals. The comparing circuit 403 compares the characteristic data extracted by the image detecting circuit 401 with the reference characteristic data stored in the memory 402, and outputs a similarity value obtained by evaluating the degree of similarity between both data. The determination circuit 404 has a first reference similarity value and a second reference similarity value less than the first reference similarity value. The determination circuit 404 then determines whether or not the similarity value output by the comparing circuit 403 is equal to or greater than the first reference similarity value and the second reference similarity value. The copy operation control circuit 405 activates either a copy prohibiting signal or a copy executing signal in accordance with the determination result obtained by the determination circuit 404. In addition, the marking control circuit 406 switches a marking signal from an active state to an inactive state and vice versa. The copy prohibiting signal and the copy executing signal are supplied to the system controller 303, the system controller 303 controls the operation of the copying apparatus in accordance with states of the copy prohibiting signal and the copy executing signal. The marking signal is supplied to the marking unit 112, and the marking unit 112 is activated or inactivated in accordance with the state of the marking signal.

In the copying apparatus as described above, the following operation is carried out.

Image data corresponding to a characteristic portion of the special original, such as a seal portion of the paper money, is extracted, and the extracted image data is stored as the reference characteristic data in the memory 402. The special original includes Japanese paper money and securities and those in respective countries in the world. The reference characteristic data corresponding to a special original is determined based on the analysis of image data for the corresponding special original.

Image data corresponding to a number portion, a signature portion or a portrait portion other than the image data corresponding to the seal may be determined as the reference characteristic data.

When an operator sets an original on the original setting base 101 and carries out a starting operation, the optical scanning system 102 scans the original and image signals are output from the image sensor in the optical scanning system 102. In the original determination unit 400, characteristic data is extracted from the image data corresponding to the image signals by the image detecting circuit 401. The characteristic data and the reference characteristic data stored in the memory 402 are then compared with each other by the comparing circuit 403. In the comparing circuit 403, for example, the characteristic data which has been actually extracted is divided into pixels, the number of pixels and the distribution state of pixels are respectively compared with those of the reference characteristic data, and a similarity value is calculated based on the comparison results in accordance with a predetermined algorithm. The similarity value is represented, for example, by a percentage. The greater the similarity value the more similar is the original to the special original.

Figure 7:
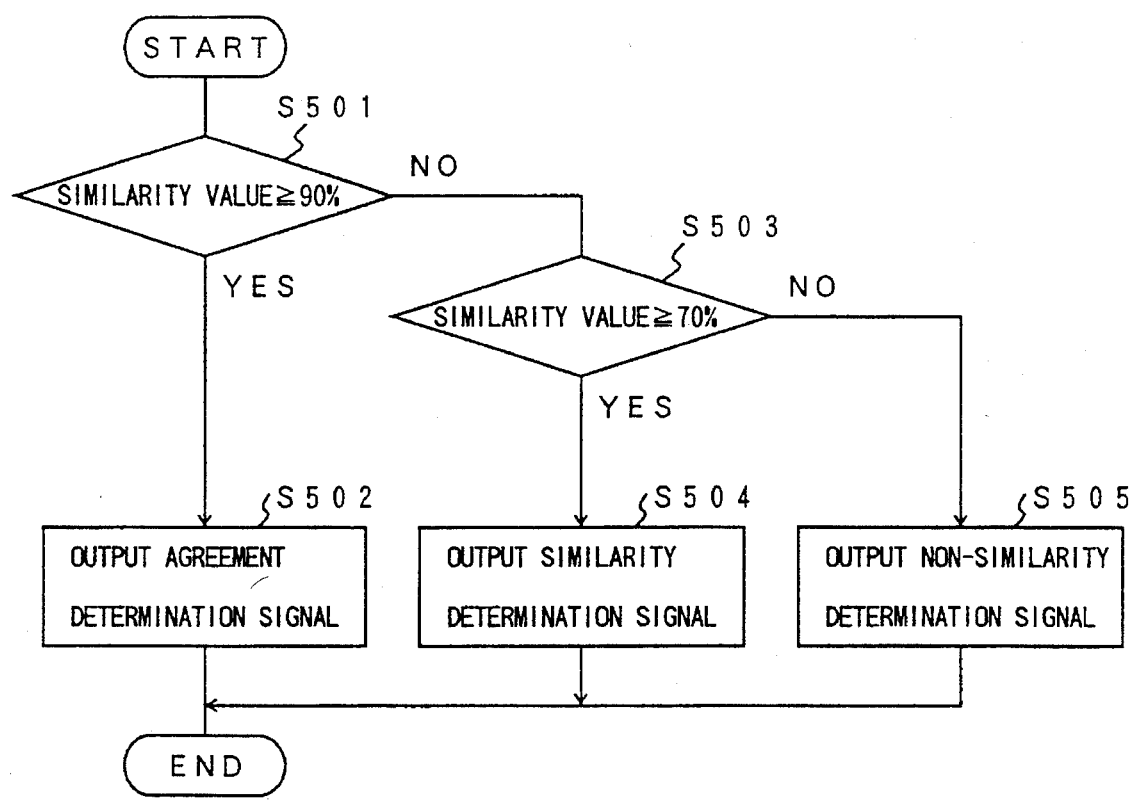
FIG. 7 is a flow chart illustrating an operation of a determination circuit of the original determination unit.

The determination circuit 404 carries out a determination process in accordance with a flow chart shown in FIG. 7. That is, it is determined whether or not the similarity value obtained by the comparing circuit 403 is equal to or greater than the first reference similarity value (e.g. 90%) (S501). If the similarity value is equal to or greater than the first reference similarity value (90%), the determination circuit 404 outputs an agreement determining signal (S502). When the agreement determining signal is supplied to the copy operation control circuit 405 and the marking control circuit 406, the copy operation control circuit 405 activates the copy prohibiting signal (e.g. a high level) and inactivates the copy executing signal, and the marking control circuit 406 maintains the marking signal in an inactive state. The system controller 30 to which the copy prohibiting signal activated as described above is input causes the operation of a printer system, including the image processing unit 301, the laser writing unit 103, the photosensitive drum 104 and the developing unit 106, to stop. A prohibiting message is then supplied from the system controller 30 to the operation/display unit 302. As a result, the copy operation is stopped, and the prohibiting message, for example, "THIS ORIGINAL CANNOT BE COPIED: COPY PROHIBITED" is displayed on the operation/display unit 302.

Returning to FIG. 7, if it is determined, in step S501, that the similarity value is less than the first reference similarity value (90%), it is further determined whether or not the similarity value is equal to or greater than the second reference similarity value (e.g. 70%) (S503). If the similarity value is equal to or greater than the second reference similarity value (70%), the determination circuit 404 outputs a similarity determination signal (S504). In this case, the similarity value x falls in a range of $$70\% \leq x < 90\%.$$

When the similarity determination signal is supplied to the copy operation control circuit 405 and the marking control circuit 406, the copy operation control circuit 405 inactivates the copy prohibiting signal and activates the copy executing signal, and the marking control circuit 406 activates the marking signal. The system controller 30 to which the copy executing signal activated as described above is input supplies a normal control signal to the printer system. As a result, a multi-colored image is formed, based on the image data (Y, M, C, BK) output from the image processing unit 301, on recording papers ejected from the paper supply unit 113. In addition, in the marking unit 112 to which the marking signal activated as described above is input, the pressure roller 117 is moved so as to be brought into contact with the marking roller 114, and the marking roller 114 is rotated. Thus, when the recording sheet on which the multi-colored image is formed passes through the marking unit 112, the marks are printed on the rear surface of the recording paper as shown in FIG. 3.

Returning to FIG. 7, if it is determined, in step S503, that the similarity value is less than the second reference similarity value (70%), the determination circuit 404 outputs a non-similarity determination signal (S505). When the non-similarity determination signal is supplied to the copy operation control circuit 405 and the marking control circuit 406, the copy operation control circuit 405 inactivates the copy prohibiting signal and activates the copy executing signal, and the marking control circuit 406 inactivates the marking signal. As a result, in the marking unit 112, the pressure roller 117 is separated from the marking roller 114 and the normal copy operation is carried out.

As has been described above, according to the first embodiment, only when it is securely determined that an original set on the copying apparatus is the special original such as the paper money (the similarity value is equal to or greater than 90%), the copy operation is prohibited. Thus, even if a normal original is similar to the special original, the copy operation is not prevented. In addition, even if an original which is determined as being similar to the special original is the special original, the marks identifying the copying apparatus are printed on the rear surface of the recording sheet. Thus, based on the marks painted on the paper money or the securities which have been forged by illegal copy, at least a copying apparatus used for the illegal copy can be easily identified.

Furthermore, in a case where the copy operation is prohibited, the prohibiting message is displayed on the operation/display unit 302. Thus, the operator is not prevented from erroneously determining that the copying apparatus malfunctions.

A description will now be given of a second embodiment of the present invention.

Figure 8:
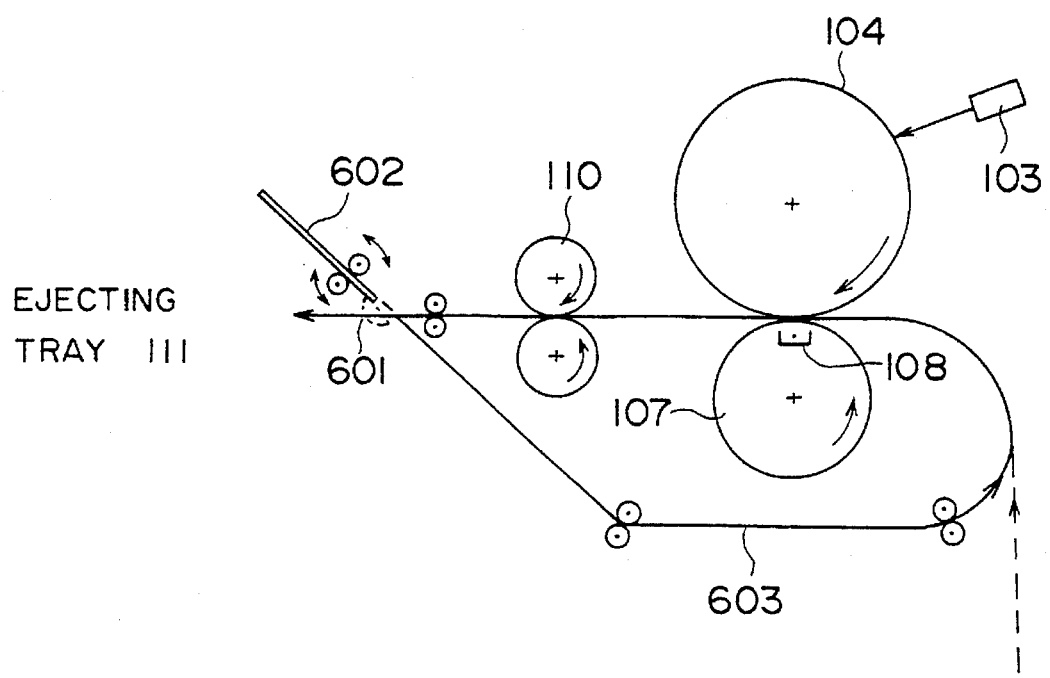
FIG. 8 is a diagram illustrating feeding paths for recording papers in a copying apparatus according to a second embodiment.

In the second embodiment, the marks representing information identifying the copying apparatus are formed on the rear surface of a recording paper in accordance with an electrophotographic process using the laser writing unit 103, the photosensitive drum 104, the charging unit 105, the developing unit 106 and other units, in the same manner as a copied image. Feeding paths for recording papers are formed, for example, as shown in FIG. 8. FIG. 8 mainly shows feeding paths for recording papers on which copied images are formed, and the copying machine in this embodiment has approximately the same essential structure as that shown in FIG. 1. However, the copying machine according to the second embodiment is not provided with the marking unit shown in FIG. 1.

Referring to FIG. 8, a switch-back path 602 and a switching nail 601 for selecting the switch-back path 602 or a path extending toward the ejecting tray 111 are provided at the downstream side of the fixer unit 110. In addition, a reversing path 603 connected to the switch-back path 602 is smoothly connected to a paper supplying path extending from the paper supply unit 113.

Figure 9:
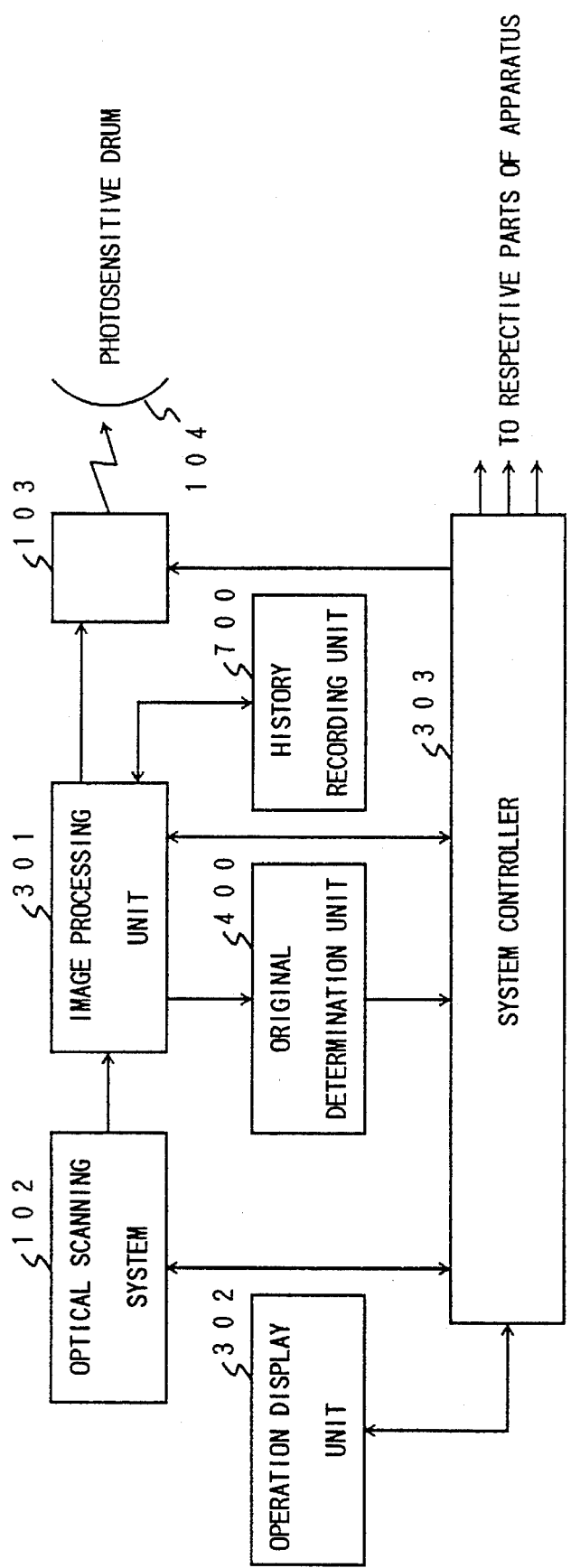
FIG. 9 is a diagram illustrating a control circuit of the copying apparatus according to the second embodiment.
Figure 10:
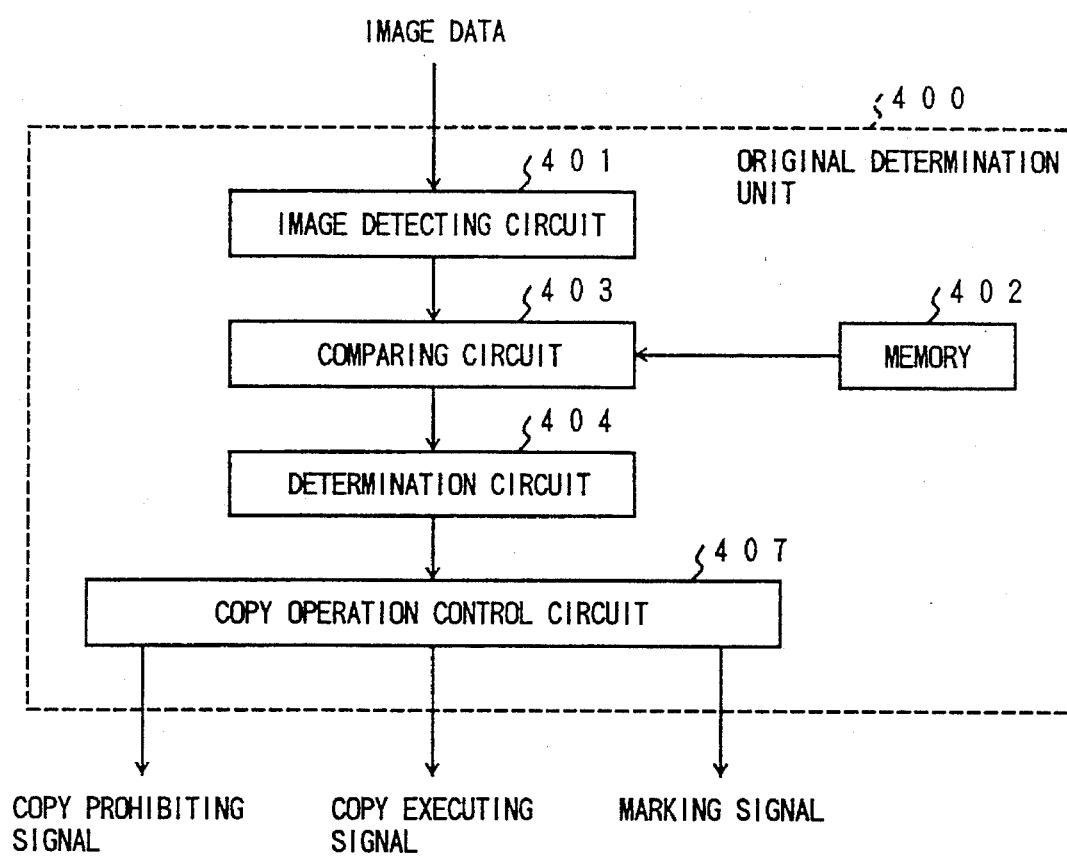
FIG. 10 is a block diagram illustrating a constitution of an original determination unit provided in the control circuit shown in FIG. 9.

In addition, a control circuit of the copying apparatus is formed as shown in FIG. 9. That is, the control circuit is provided with a history recording unit 700 for recording a history regarding the copy operation. The original determination unit 400 is formed as shown in FIG. 10, and other units are the same as those shown in FIG. 5. Referring to FIG. 10, the original determination unit 400 has the image detecting circuit 401, the memory 402, the comparing circuit 403, the determination circuit 404 and a copy operation control circuit 407 the image detecting circuit 401, the memory 402, the comparing circuit 403 and the determination circuit 404 are the same as those shown in FIG. 6. The copy operation control circuit 407 controls the states of the copy prohibiting signal, the copy executing signal and the marking signal based on the determination signals (the agreement determination signal, the similarity determination signal and the non-similarity determination signal) output from the determination circuit 404 in accordance with the flow chart shown in FIG. 7.

In the original determination unit 400 provided in the copying apparatus as described above, when the agreement determination signal is output from the determination circuit 404 (the similarity value is equal to or greater than 90%), the copy operation control circuit 407 activates the copy prohibiting signal. As a result, the copy operation is prohibited in the same manner as in the case of the first embodiment. At this time, the system controller 303 outputs history information regarding the prohibited copy operation, such as a date, a user ID, a type of detected special original and a similarity value. The history information is recorded in the history recording unit 700. In addition, when the non-similarity signal is output from the determination circuit 404 (the similarity value is less than 70%), the copy operation control circuit 407 activates the copy executing signal. As a result, the normal copy operation is carried out, so that a multi-colored image corresponding to an original image is formed on a recording paper. The switching nail 601 shown in FIG. 8 is switched so as to select the path extending toward the ejecting tray 111, so that the recording paper passes through the fixer unit 110 and is ejected to the ejecting tray 111.

Furthermore, when the similarity determination signal is output from the determination circuit 404 (the similarity value is less than 90% and is equal to or greater than 70%), the copy operation control circuit 407 activates the copy executing signal and the marking signal. As a result, the normal copy operation is carried out, so that a multi-colored image corresponding to the original image is formed on a recording paper. Further, the electrophotographic process in the normal copy operation is completed, image data corresponding to the marks shown in FIG. 3 is output from the image processing unit 301 based on an instruction from the system controller 303. Then, in a state where the section for supplying the black toner (BK) is activated in the developing unit 106, the electrophotographic process is performed on the photosensitive drum 104 again. At this time, the switching nail 602 shown in FIG. 8 is switched so as to select the switch-back path 602, so that a recording paper obtained by the normal copy operation as described above passes through the fixer unit 110 and is then directed to the switch-back path 602. When the recording paper is completely in the switch-back path 602, feed rollers are reversed so that the recording paper is directed from the switch-back path 602 to the reversing path 603. The recording paper fed in the reversing path 603 is reversed and directed to the photosensitive drum 104. Black toner (BK) images of the marks are then formed on the rear surface (opposite to the surface on which the multi-colored image is formed by the normal copy operation) of the recording paper. After this, the switching nail 601 shown in FIG. 8 is switched so as to select the path extending toward the ejecting tray 111, so that the recording paper passes through the fixer unit 110 again and is ejected to the ejecting tray 111. In this case, the history information regarding the copy operation is recorded in the history recording unit 700 in the same manner as in a case where the copy operation is prohibited.

In the second embodiment, the same effects as in the case of the first embodiment are obtained. Furthermore, when the copy operation is prohibited and when the marks are printed on a recording paper, the history information regarding the copy operation is recorded in the history recording unit 700. Thus, a person which carried out the illegal copy can be easily identified.

In the above first and second embodiments, in the case where the copy operation is prohibited, the following process may be carried out.

First, a serviceman called by the user directly operates the system board so that a state of the system (in which the copy operation is prohibited) is reset. Second, information indicating that the illegal copy was carried out is transmitted to a service station via a line. Then, a serviceman dispatched from the service station resets a state of the system as has been described above. Third, when the operator inputs a predetermined password number using numeral keys on the operation/display unit 302 in a state where the history information is recorded in the history recording unit 700, the copying apparatus returns to a state where the copy operation can be carried out.

The marks representing the information identifying the copying apparatus can be printed on the surface of the recording sheet on which surface the copied image is formed. In this case, in the marking unit 112, the ink having a high transmittance to visible light and a low transmittance to light other than the visible light is used. In addition, ink having a color which is hardly seen by human eyesight, such as light yellow ink is used. Furthermore, in a case where the marks are formed, in accordance with the electrophotographic process, on the surface of the recording paper on which surface a copied image is formed, the section for supplying the yellow toner (Y) is activated in the developing unit 105.

The structure of the marking unit 112 is not limited to that shown in FIG. 2, and, for example, a known ink jet recording unit can be used as the marking unit 112.

A description will now be given of a third embodiment of the present invention.

In the third embodiment, the copying apparatus has the same structure as that shown in FIG. 1. In addition, the control circuit is formed as shown in FIG. 11.

Figure 11:
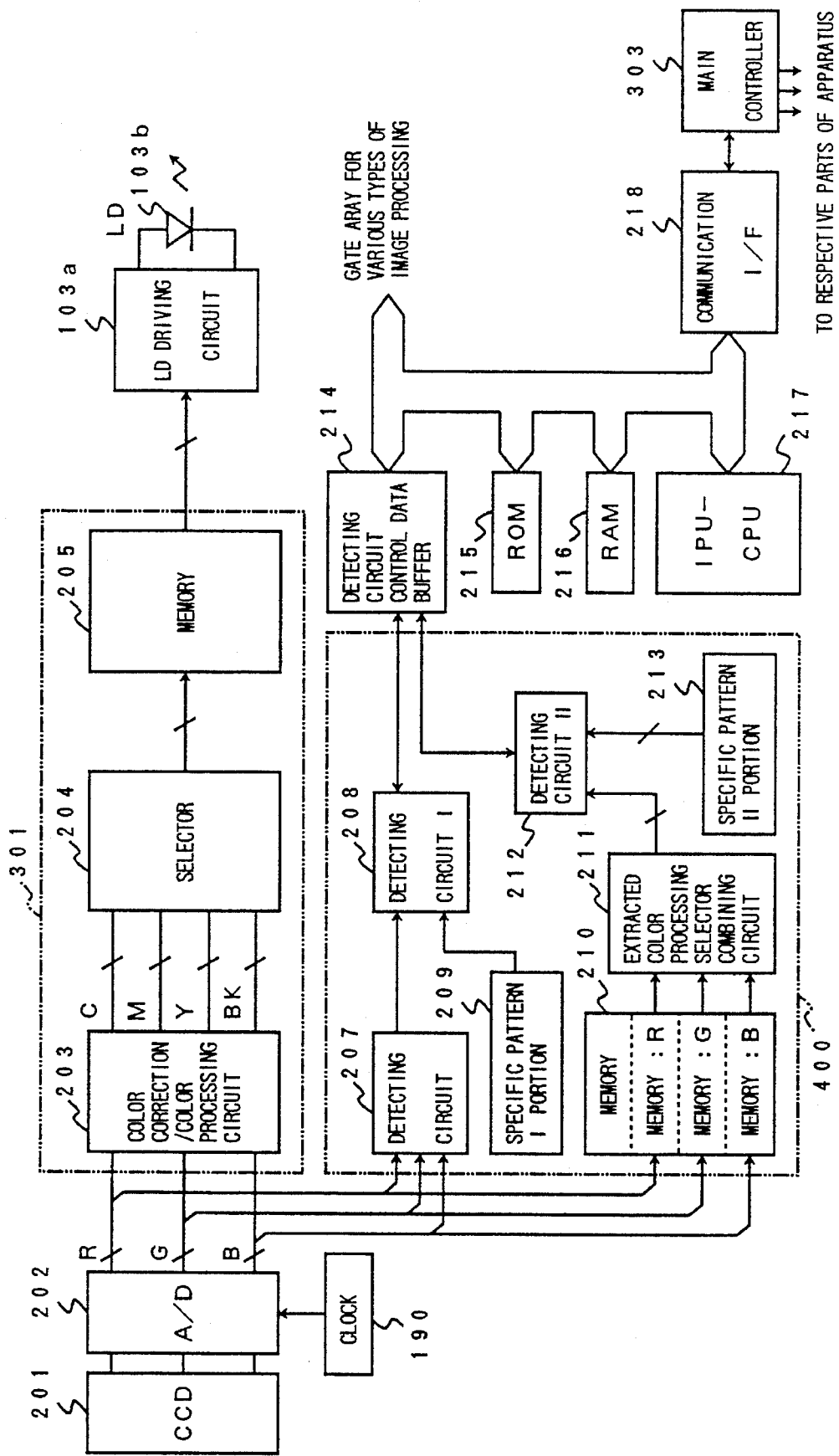
FIG. 11 is a block diagram illustrating a control circuit of a copying apparatus according to a third embodiment.

Referring to FIG. 11, detecting signals from an image sensor 201 provided in the optical scanning system are converted into digital image signals (RGB signals) by an A/D converter 202 operated in synchronism with a clock signal from a clock generator 190. The RGB signals are supplied to the image processing unit 301. The image processing unit 301 has a color-correction/color-processing circuit 203, a selector 204 and a memory 205. The color-correction/color-processing circuit 203 receives the RGB signals and carries out the color correction and the color processing. The selector 204 successively selects one of color image signals corresponding to cyan (C), magenta (M), yellow (Y) and black (BK) output from the color-correction/color-processing circuit 203. A color image signal output from the selector 204 is temporarily stored in the memory 205. A driving circuit 103a drives a laser diode 103b based on the color image signals from the image processing unit 301. In addition, the RGB signals from the A/D converter 202 are also supplied to the original determination unit 400. This control circuit further has a control data buffer 214 for storing determination results obtained by the original determination unit 400, a ROM 215, a RAM 216 and an IPU-CPU 217 (a CPU for image processing), and is connected to the system controller 303 via a communication interface 218.

The original determination unit 400 has a first determination system and a second determination system. The first determination system is formed of an extracting circuit 207, a first specific pattern memory 209 (formed of an EEPROM or a non-volatile RAM) and a first detecting circuit 208. The extracting circuit 207 extracts a specific pattern from RGB signals supplied in reading operation for an original. A reference pattern identifying the special original such as the paper money is stored in the first specific pattern memory 209. The first detecting circuit 208 determines whether or not the specific pattern extracted by the extracting circuit 207 is matched to the reference pattern stored in the first specific pattern memory 209. That is, in the first determination system, it is determined, in synchronism with the reading operation for the original, whether or not the original is the special original. Since the process is carried out in synchronism with the reading operation for the original, a determination result can be rapidly obtained in the first determination system. The second determination system has an image signal memory 210, a combining circuit 211, a second specific pattern memory 213 (formed of an EEPROM or a non-volatile RAM) and a second detecting circuit 212. The image signal memory 210 divides the RGB signals supplied in the reading operation for the original into an R-signal, a G-signal and a B-signal and stores these signals. The combining circuit 211 processes the R-signal, the G-signal and the B-signal read out from the image signal memory 210 in accordance with a predetermined algorithm, and outputs a specific pattern obtained by selectively combining processed signals. The second specific pattern memory 213 stores a reference pattern identifying the special original. The second detecting circuit 212 determines whether or not the specific pattern from the combining circuit 211 is matched to the reference pattern stored in the second specific pattern memory 211. That is, in the second determination system, the RGB signals for one page obtained by the reading operation for the original are stored in the image signal memory 210. After the reading operation for the original is completed, it is determined, based on the RGB signals (the image signals) stored in the image signal memory 210, whether or not the original is the special original. Since the specific pattern of the original is made based on the image signals for one page stored in the image signal memory 210, a time required in the second determination system is longer than a time required in the first determination system. However, the determination accuracy obtained in the second determination system is superior to the determination accuracy obtained in the first determination system.

The determination results obtained by the first and second determination systems are stored in the control data buffer 214. The determination results are supplied from the control data buffer 214 to the system controller 303 via the data bus and the communication interface 218 in response to the request from the system controller 303.

Figure 12:
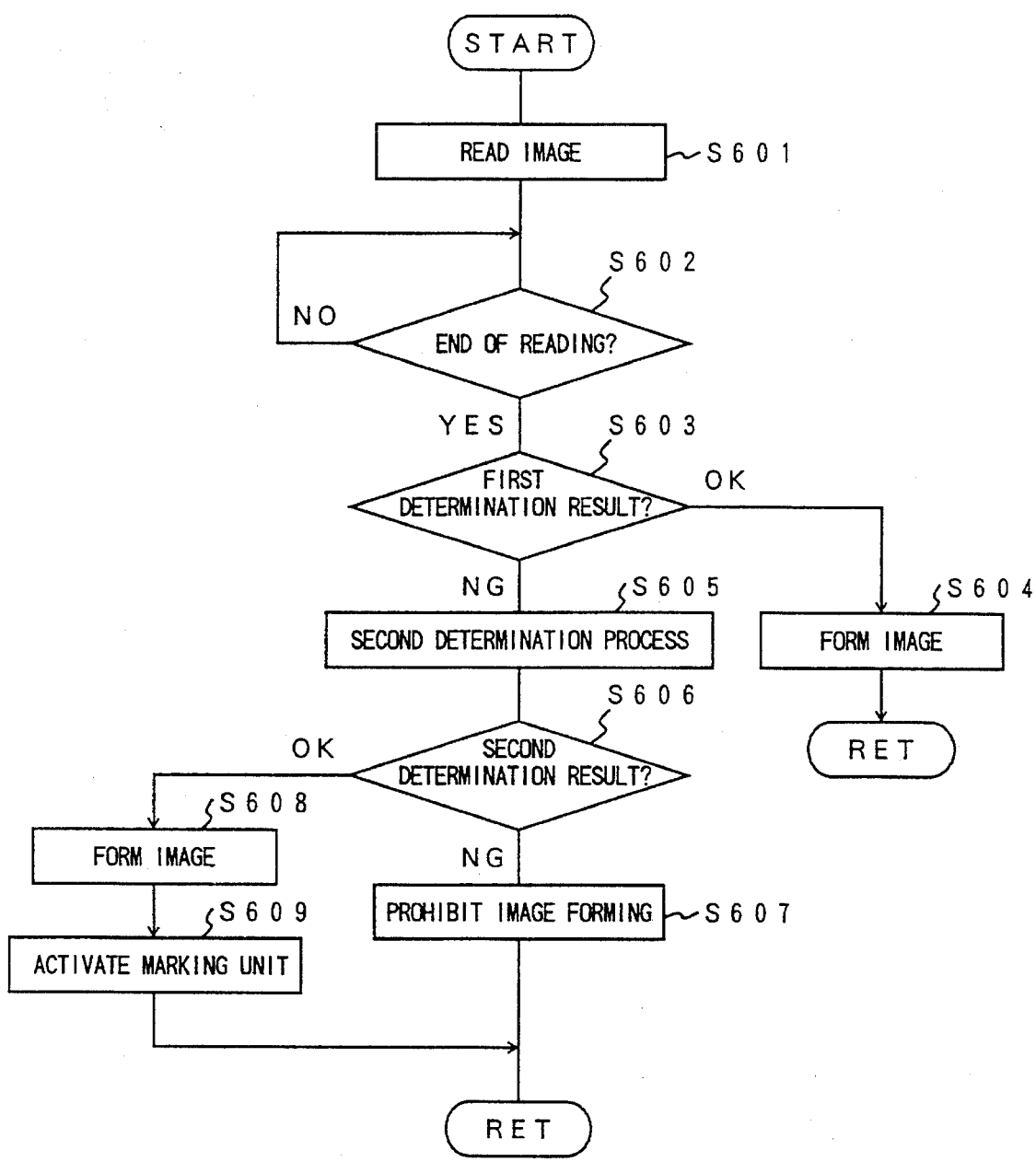
FIG. 12 is a flow chart illustrating a process of a system controller shown in FIG. 11.

When an image forming process is carried out, system controller 303 carries out a process in accordance with a flow chart shown in FIG. 12.

When a start operation is performed in a state where an original is set on the original setting base 101, the system controller 303 supplies an activating signal to the optical scanning system (S601). Thus, the optical scanning system scans the original, and RGB signals depending on detecting signals output from the image sensor 201 are supplied to the image processing unit 301 and the original determination unit 400. While the original is being read, in the image processing unit 301, color image signals (C, M, Y, BK) are stored in the memory 205. In addition, in the first determination system of the original determination unit 400 (the extracting circuit 207, the first detecting circuit 208 and the first specific pattern memory 209), a determination process is carried out. In the second determination system (the image signal memory 210, the combining circuit 211, the second detecting circuit 212 and the second specific pattern memory 213), the RGB signals are successively stored in the image signal memory 210. While the above process is being carried out, the system controller 303 determines whether or not the reading operation is completed (S602). When the reading operation for the original by the optical scanning system is completed, a terminating signal is supplied from the optical scanning system to the system controller 303, so that the system controller determines, based on the terminating signal, whether the reading operation for the original has been completed. At this time, the process in the first determination system of the original determination unit 301 is also completed, the determination result (a first determination result) is stored in the control data buffer 214. The system controller 303 reads out the determination result from the control data buffer 214. If it is determined, based on the determination result, that the original is not the special original such as the paper money (S603), the system controller 303 supplies a control signal for starting of the image processing to the image processing unit 301 and the printer system shown in FIG. 1 (S604). As a result, the image signals stored in the memory 205 in the image processing unit 301 are supplied to the laser writing unit, and a multi-colored image corresponding to the original is formed on a recording paper.

On the other hand, when the system controller 303 detects, based on the determination result (the first determination result), that the original is the special original (S603), the original determination unit 400 is instructed that the second determination process is carried out (S605). In response to receiving the instruction, in the second determination system of the original determination unit 400, it is determined whether or not a specific pattern of the original obtained from the RGB signals stored in the memory 210 is matched to the reference pattern. The determination result (the second determination result) is then stored in the control data buffer 214. After this, the system controller 303 reads out the second determination result from the control data buffer 214. When it is determined, based on the determination result, that the original is the special original (S606), the system controller 303 supplies an instruction for prohibiting the image forming process to the image processing unit 301 and the printer system (S607). As a result, the image signals stored in the memory 205 of the image processing unit 301 is cleared and the printer system is not activated. At this time, the message representing that the image forming processing has been prohibited is displayed on the operation/display unit, in the same manner as in the first embodiment. On the other hand, when it is determined, based on the second determination result, that the original differs from the special original (S606), the system controller 303 supplies a starting instruction for the image forming process to the printer system (S608) and supplies an activation signal to the marking unit 112 (S609). As a result, in the same manner as in .the first embodiment, a multicolored image corresponding to the original is formed on a recording paper and marks identifying the copying apparatus are formed on the rear surface of the recording paper as shown in FIG. 3.

According to the third embodiment described above, in a case where only the first determination system determines that the original is the special original, the rank of certainty to the determination result will be low. In this case, the image forming process is not prohibited and the marks identifying the copying apparatus are formed on the rear surface of the recording paper on which the multi-colored image is formed. In addition, in a case where both the first and second determination systems determine that the original is the special original, the rank of certainty to the determination will be high. In this case, the image forming process is prohibited. Thus, an original which is clearly seen as not being the special original is applied to only the first determination system. An original which is doubtful to be the special original and an original which is clearly seen to be the special original, that is, only originals which are determined as being the special original by the first determination system are applied to the second determination system. As a result, the copy operation for the normal originals can be performed without hindrance.

The processes in the first and second determination systems are not limited to those in the above embodiments, but the following processes may be performed therein.

Figure 13:
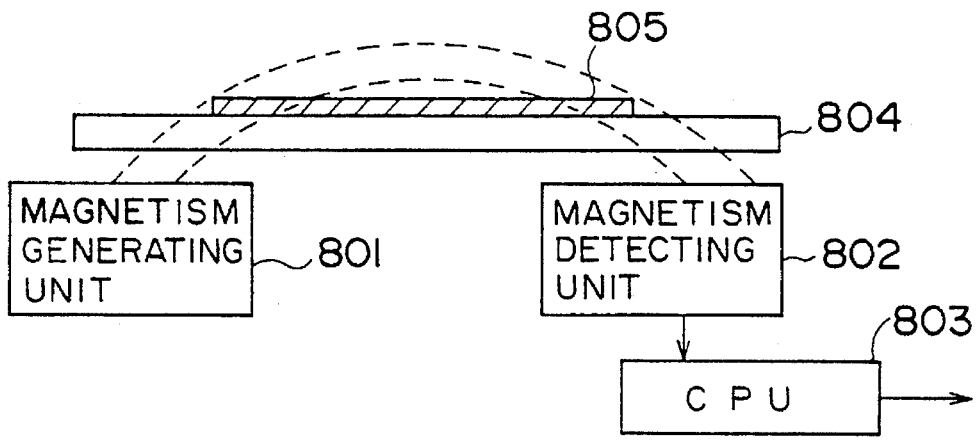
FIG. 13 is a diagram illustrating a method of determining the special original.

FIG. 13 shows a determination system using magnetic information of the special original. Referring to FIG. 13, a magnetism generating unit 801 and a magnetism detecting unit 802 are located under a contact glass 804. When a special original 805 such as paper money using magnetic ink is set on the contact glass 804, a magnetic field generated by the magnetism generating unit 801 is directed to the magnetism detecting unit 802 by the magnetic ink of the special original 805. As a result, the magnetism detecting unit 802 detects the magnetic field, and a CPU 803 determines, based on the detecting result, whether or not the original is the special original 805.

Figure 14:
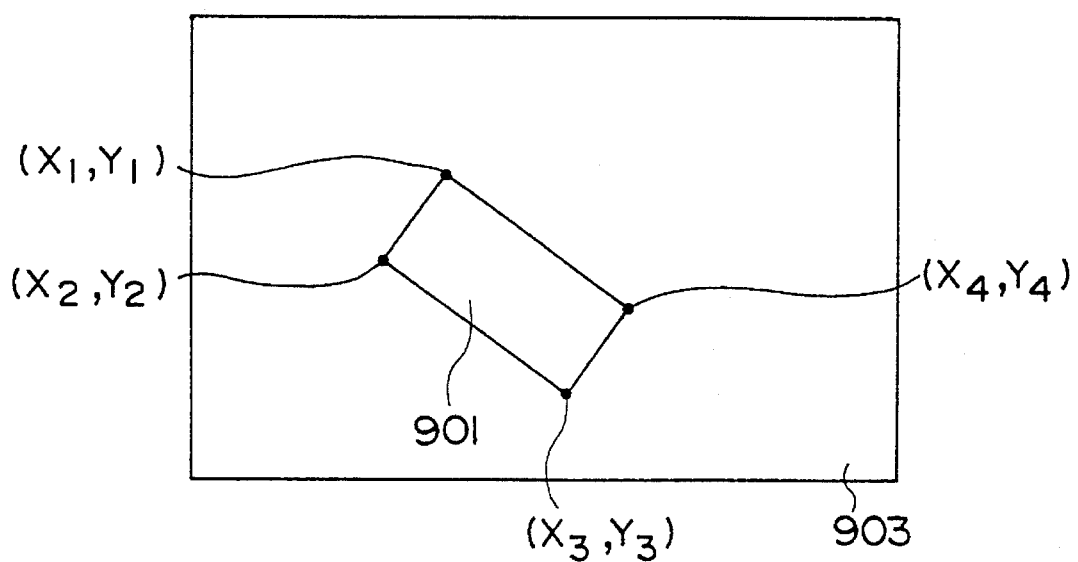
FIG. 14 is a diagram illustrating another method of determining the special original.

FIG. 14 shows a determination system which determines, using the shape of an original, whether or not the original is the special original. Referring to FIG. 14, coordinates (x1, y1), (x2, y2), (x3, y3) and (x4, y4) corresponding to corners of the special original 901 set on a contact glass 903 are calculated based on image information obtained by the optical scanning system. A shape of the original is detected based on the respective coordinates. It is then determined, based on the detecting result, whether or not the original is the special original 901.

FIG. 15 shows a method for determining, based on the color histogram of a background of an original, whether or not the original is the special original. In this method, a background color of the original is extracted. The color histogram (R, G, B) of the extracted background color of the original as shown in FIG. 15(a) and a reference color histogram, as shown in FIG. 15(b) which is registered in a memory are compared with each other. It is determined, based on the comparon result, whether of not the original is the special original.

Figure 16:
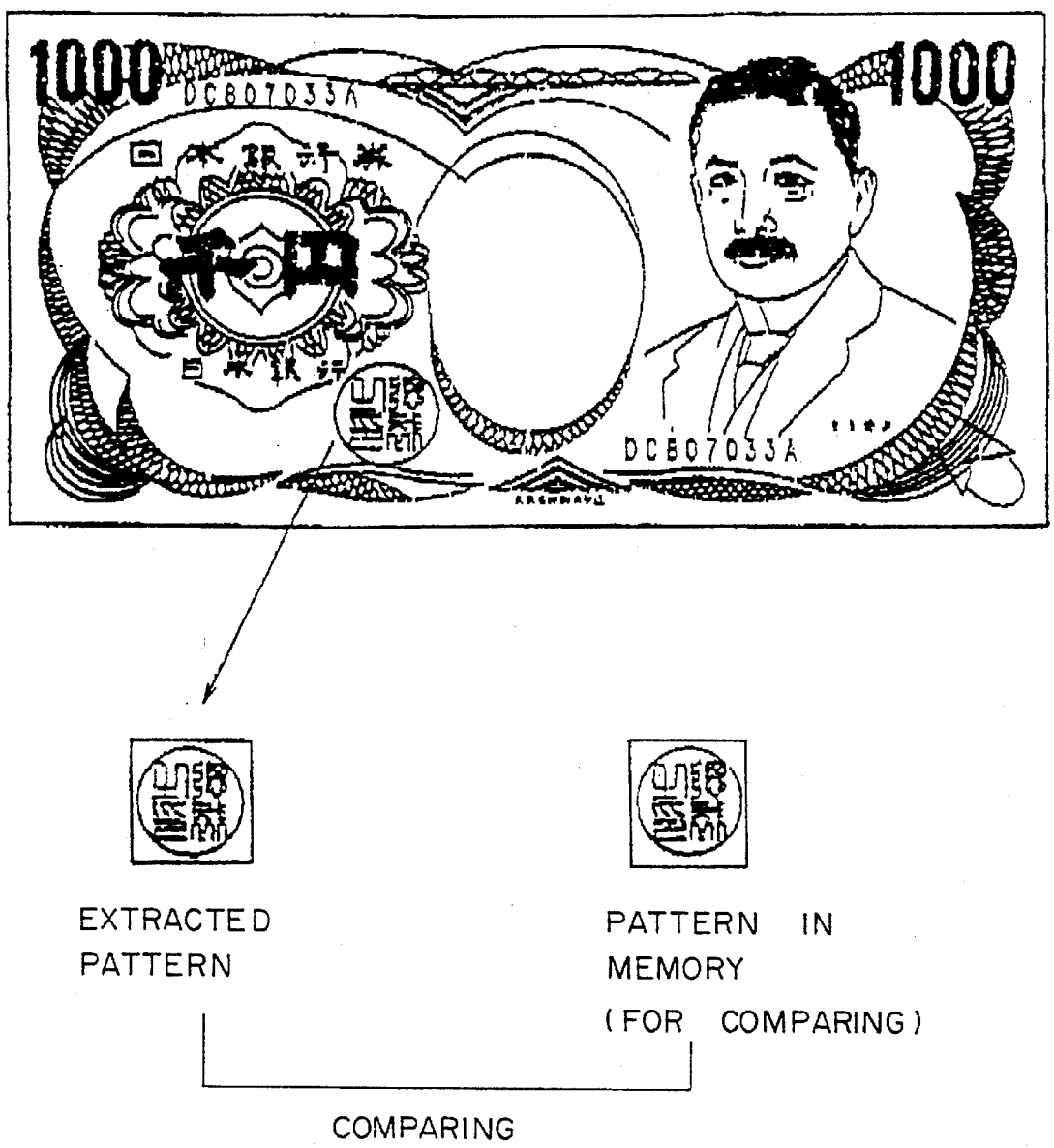
FIG. 16 is a diagram illustrating another method of determining the special original.

FIG. 16 is a method for determining, using a specific pattern of the special original, whether or not an original is the special original. In this method, a specific pattern (the whole special original or a part of the special original), such as a seal portion of the paper money, is extracted from the special original. The extracted specific pattern and a reference pattern which is registered in a memory are compared with each other. It is then determined, based on the comparing result, whether or not the original is the special original.

FIG. 17 shows a method for determining, based on the color histogram of an original, whether or not the original is the special original. In this method, the hue of the original is extracted. The color histogram (R,G, B) of a part or the whole of the original from which the hue is extracted is compared with the reference color histogram registered in a memory. It is then determined, based on the comparing result, whether or not the original is the special original.

A further description will now be given of an example in which image data is coded into chain codes.

Figure 18:
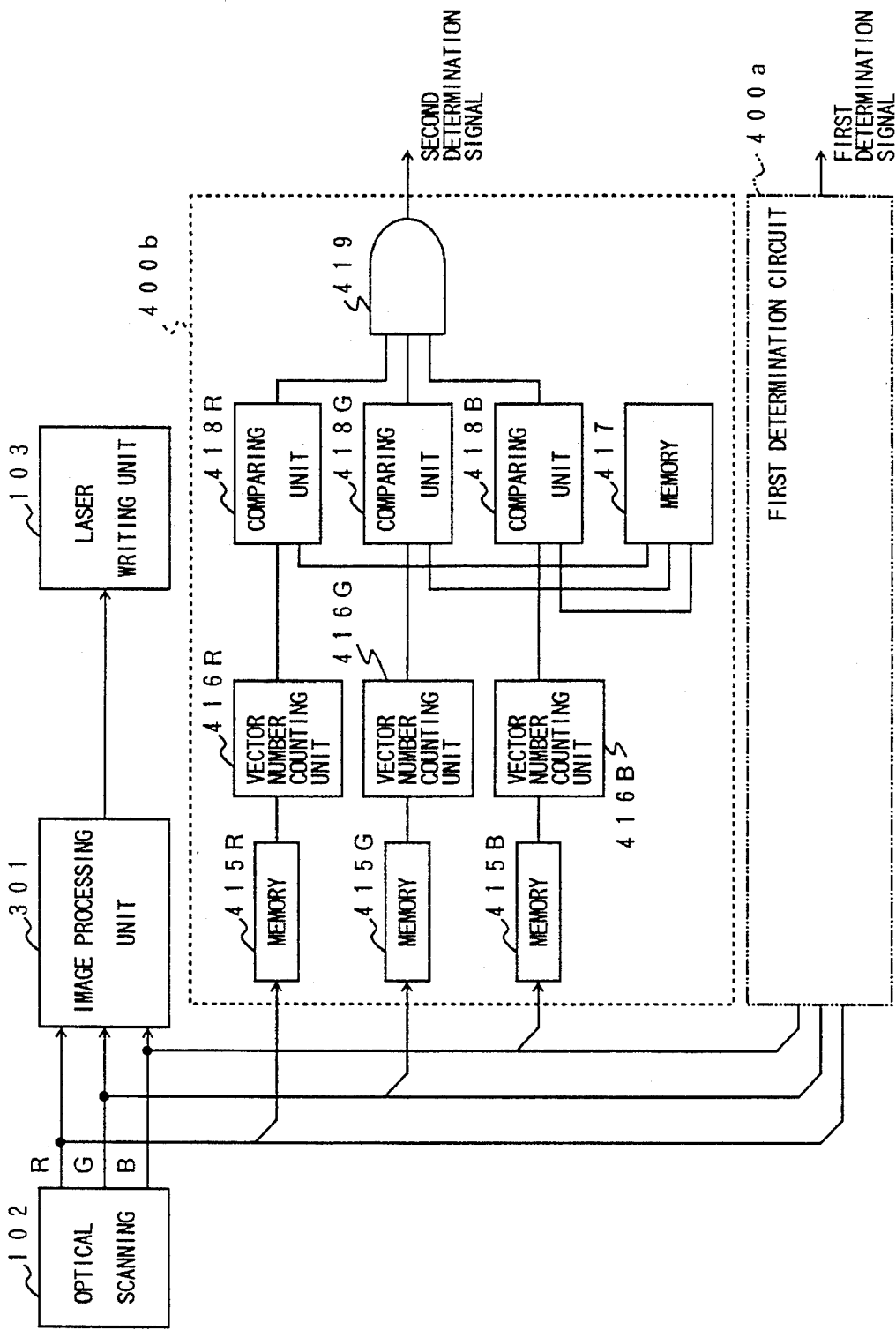
FIG. 18 is a block diagram illustrating a modification of a second determination system of the original determination unit of the controller shown in FIG. 11.

A control circuit shown in FIG. 18 has the optical scanning system 102, the image processing unit 301, the laser writing unit 103, the first determination system 400a and the second determination system, in the same manner as in the third embodiment. In the second determination system 400b, the image data is coded into chain codes. The second determination system 400b is provided with memories 415R, 415G and 415B, vector number operating circuits 416R, 416G and 416B, comparing circuits 418R, 418G and 418B, a reference data memory 417 and an AND circuit 419. Image data: R-data (red), G-data (green) and B-data (blue) are temporarily stored in the memories 415R, 415G and 415B respectively. The vector number operating circuits 416R, 416G and 416B are respectively connected to the memories 415R, 415G and 415B, and the comparing circuits 418R, 418G and 418B are respectively connected to the vector number operating circuits 416R, 416G and 416B. Each of the vector number operating circuits 416R, 416G and 416B codes R-data, G-data or B data from a corresponding one of the memories 415R, 415G and 415B into chain codes so that the vectorization of the data is performed. Vector numbers in respective directions are then calculated. The reference data memory 417 is provided with vector numbers which have been previously calculated for the special original in the respective directions. Each of the comparing circuits 418R, 418G and 418B compares the vector numbers calculated by a corresponding one of the vector number operating circuits 416R, 416G and 416B with the reference vector numbers stored in the reference data memory 417. Each of the comparing circuits 418R, 418G and 418B outputs a determination signal based on the comparing result. The AND circuit 419 to which the determination signals are supplied from the comparing circuits 418R, 418G and 418B outputs a second determination signal representing whether or not the original is the special original.

Figure 19:
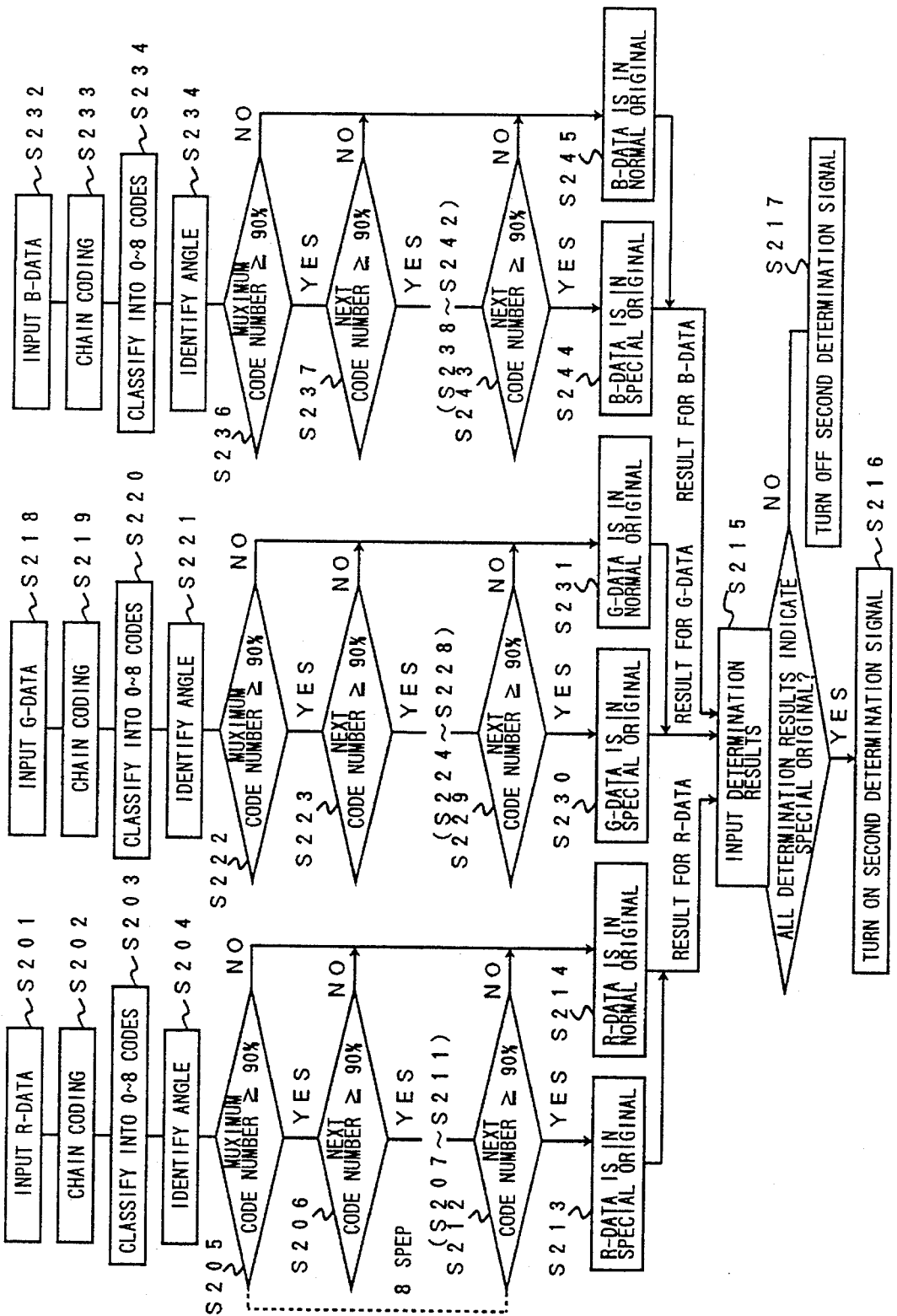
FIG. 19 is a flow chart illustrating an operation of the second determination system shown in FIG. 18.

In the second determination system 400b described above, a process is carried out in accordance with a flow chart shown in FIG. 19.

Figure 20:
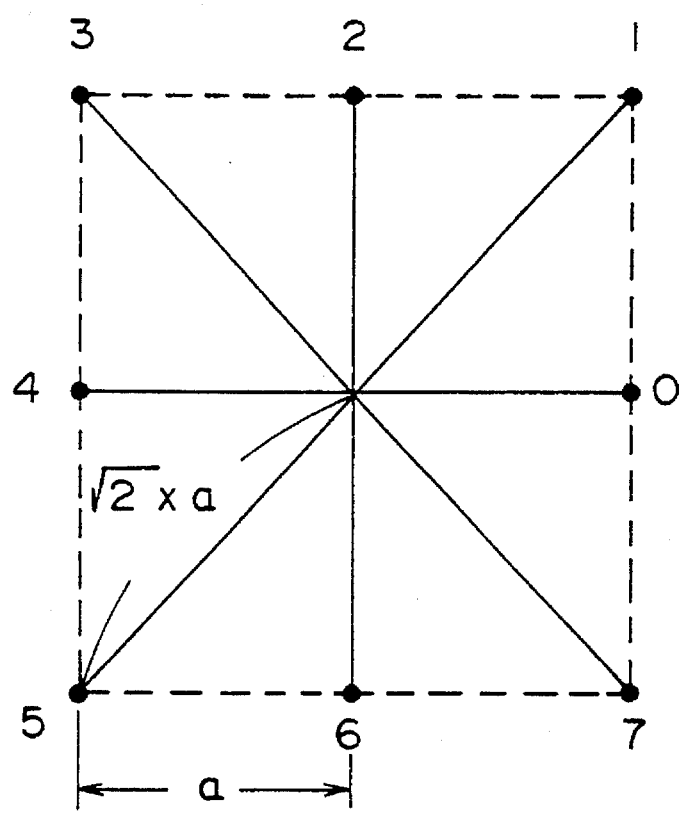
FIG. 20 is a diagram illustrating an example of chain coding.

First, the R-data, G-data and B-data obtained by the optical scanning system 102 are respectively input to the memories 415R, 415G and 415B (S201, S218 and S232). Next, in the vector number operating circuits 416R, 416G and 416B, the outline of a line figure (image data) is coded into chain codes (S202, S219 and S233), so that the image data is classified into eight codes "0"–"7" shown in FIG. 20. FIG. 20 illustrates a chain coding method which is generally known. In this chain coding method, a line figure is represented by connection of vectors having a length of a or √2a and eight directions, where a represents a length of a side of a quantizing lattice. That is, codes "0"–"7" are assigned to the line figure in accordance with the directions of the vectors. According to this chain coding method, the line figure is converted into eight codes depending on the directions, and the number of codes is counted.

In a case of the special original, the distribution of numbers of codes in accordance with characteristics of an image is uniform. Thus, with reference to the distribution of the numbers of codes, an angle at which the special original is set on the copy apparatus can be determined. Actually, the angle of the special original can be determined with reference to only the maximum number of codes (S204, S221 and S234).

The number of codes obtained by chain coding of the special original is counted for each vector, and the vector number is stored as the reference vector number in the reference data memory 417, as has been described above. In the comparing circuits 418R, 418G and 418B, the reference vector number in the reference data memory 417 and the vector number of the input image data are compared code by code. If the comparing result is equal to or greater than a predetermined level (for example, the conformity rate in each code is equal to or greater than 90%), it is determined that the original is the special original. Thus, in the process to this point, the determination results are obtained, based on the R-data, G-data and B-data, from the respective comparing circuits 418R, 418G and 418B (S205–S214, S222–S231 and S2356–S245).

The AND circuit 419 receives the determination results from the respective comparing circuits 418R, 418G and 418B. When all the determination results represent that the original is the special original, the AND circuit 419 turns on the second determination signal (S215 and S216). In other cases, the second determination signal is turned off (S215 and S217). The system controller 303 then controls the printer system and the marking unit 112 in accordance with the state of the second determination signal as described in the third embodiment.

As has been described above, the image data can be represented by vectors in accordance with the chain coding method, the processing speed can be improved.

The present invention is not limited to the aforementioned embodiments, and variations and modifications may be made within the scope of the claimed invention.

POSSIBILITY OF APPLYING TO INDUSTRY

According to the present invention, only when the rank of certainty that the original is the special original is high, the copying operation is prohibited. In a case where the certainty is in a low rank, predetermined information is added to the recording paper. Thus, the copying operation for a normal original can be carried out without hindrance, and at least the predetermined information is added to the copy of the special original so that the copying apparatus in which the illegal copy of the special original was carried out can be identified based on the predetermined information.

We claim:

1. A copying apparatus comprising:

image reading means for optically reading an original and for outputting image signals corresponding to the original;

image processing means for processing the image signals supplied from said image reading means in accordance with a predetermined method and for outputting image data;

image forming means for forming an image corresponding to the image data supplied from said image processing means on a recording sheet;

original determination means for determining whether a rank of certainty that the original is a predetermined special original is a first rank or a second rank lower than the first rank;

prohibiting means for prohibiting the image corresponding to the original from being formed on the recording sheet when the determination result obtained by said original determination means is the first rank;

information adding means for adding predetermined information to the recording sheet on which the image is formed by said image forming means when the determination result obtained by said original determination means is the second rank.

2. The copying apparatus as claimed in claim 1, wherein said original determination means comprises:

storage means for storing reference data representing a characteristic of the predetermined special original;

characteristic extracting means for generating, based on the image signals from said image reading means, characteristic data representing a characteristic of the original;

comparing means for comparing the characteristic data generated by said characteristic extracting means and the reference data in said storage means with each other and for generating a similarity value representing a degree of similarity between the characteristic data and the reference data;

first determination means for determining whether or not the similarity value from said comparing means is equal to or greater than a first reference similarity value; and second determination means for determining whether or not the similarity value from said comparing means is equal to or greater than a second reference similarity value less than the first reference similarity value, wherein when said first determination means determines that the similarity value is equal to or greater than the first reference similarity value, said original determination means determines that the rank of certainty is the first rank, when said first determination means determines that the similarity value is less than the first reference similarity value and when the second determination means determines that the similarity value is equal to or greater than the second reference similarity value, the original determination means determines that the rank of certainty is the first rank.

3. The copying apparatus as claimed in claim 1, wherein said original determination means comprises:

first determination means for determining, in accordance with a first method, whether or not the original read by said image reading means is the same as the predetermined special original; and second determination means for determining in accordance with a second method, whether or not the original read by said image reading means is the same as the predetermined special original, when both said first and second determination means determines that the original is the same as the predetermined special original, said original determination means determines that the rank of certainty is the first rank, when said first determination means determines that the original is the same as the special original and when said second determination means determines that the original is not the same as the special original, said original determination means determines that the rank of certainty is the second rank.

4. The copying apparatus as claimed in claim 1, wherein the information to be added to the recording sheet by said information adding means is a mark representing information identifying said copying apparatus.

5. The copying apparatus as claimed in claim 1, wherein the information to be added to the recording sheet by said information adding means is formed of a plurality of marks, said plurality of marks being arranged so that at least one mark is located in an area corresponding to a minimum sized special original on the recording sheet.

6. The copying apparatus as claimed in claim 1 further comprising:

display means for displaying a message indicating that the image forming is prohibited when said prohibiting means prohibits the image from being formed.

7. The copying apparatus as claimed in claim 1 further comprising:

history recording means for, when said determination means determines that the rank of certainty is either the first rank or the second rank, recording information regarding an image forming process corresponding to the determination result.

8. The copying apparatus as claimed in claim 3, wherein a determination process in said first determination means is carried out prior to a determination process in said second determination means.

9. The copying apparatus as claimed in claim 8, wherein the first method and the second method are decided so that a time required for the determination process in said first determination means is shorter than a time required for the determination process in said second determination means.

10. The copying apparatus as claimed in claim 8, wherein a determination accuracy of said second determination means is higher than a determination accuracy of said first determination means.

* * * * *